Sept. 9, 1958 D. J. BRAAK 2,851,591

SELECTIVE CALLING WIRELESS TRANSMISSION SYSTEM

Filed Feb. 9, 1953

INVENTOR
DIRK JOHAN BRAAK
BY [signature]
AGENT

United States Patent Office 2,851,591

Patented Sept. 9, 1958

2,851,591

SELECTIVE CALLING WIRELESS TRANSMISSION SYSTEM

Dirk Johan Braak, Hilversum, Netherlands, assignor, by mesne assignments, to North American Philips Company, Inc., New York, N. Y., a corporation of Delaware Application February 9, 1953, Serial No. 335,803

Claims priority, application Netherlands February 15, 1952

8 Claims. (Cl. 250—6)

The present invention concerns a system for the transmission of intelligence between a main station and a plurality of substations. More particularly, it relates to a method and devices for radio-transmission of intelligence between a main station and a plurality of substations; each substation having a receiver comprising a blocking circuit supplied by detected oscillations located outside the speech-frequency band in order the make low-frequency part of the receiver inoperative in the absence of incoming carrier oscillations.

It is nowadays common practice with, for example, police, fire, taxi and other two way communications systems, to exchange wireless intelligence between a main station, comprising a transmitter-receiver, and substations, each comprising a transmitter-receiver, for example, automobile units.

Before transmitting intelligence intended for a predetermined mobile station, a calling signal is transmitted by the main station, which signal in such a system is commonly constituted by speech oscillations, for example, "taxi 501," etc., and is received by each mobile receiver. Those mobile stations which are not called are likewise forced to listen to the message then following, in order not to miss any possible further intelligence which could be intended for them. The continuous listening to calls is troublesome and tiring and decreases the attention of the operating staffs of said mobile stations.

It is known to eliminate the said disadvantages by utilizing a so-called selective calling system in which the main station is designed to transmit an individual calling signal associated with each mobile station, for example, a combination of tones, and to provide the mobile stations with a calling selector which is responsive only upon reception of the tone combination associated with it and which then releases the receiver which, normally, is cut off. However, such a selective calling system requires the use of apparatus which is complicated and expensive.

The object of the present invention is to obtain, in a simple manner, advantages with communication systems of the kind described which hitherto were available only when use was made of a selective calling system, utilizing for this purpose means which, normally, are substantially available in communicatin systems of the said kind.

According to the present invention, after the substation being called has answered the call, a tone located above the speech-frequency band is transmitted by the transmitter of the main station for the duration of the call and is directed to the substations as an additional modulation on the speech carrier-oscillations. Said tone actuates a blocking circuit in each substation, while the blocking circuit in at least the receiver of the substation being called is made inoperative for the duration of the call.

In order that the invention may be readily carried into effect, it will now be described with reference to the accompanying drawing, in which.

Figures 1, 2, 3:
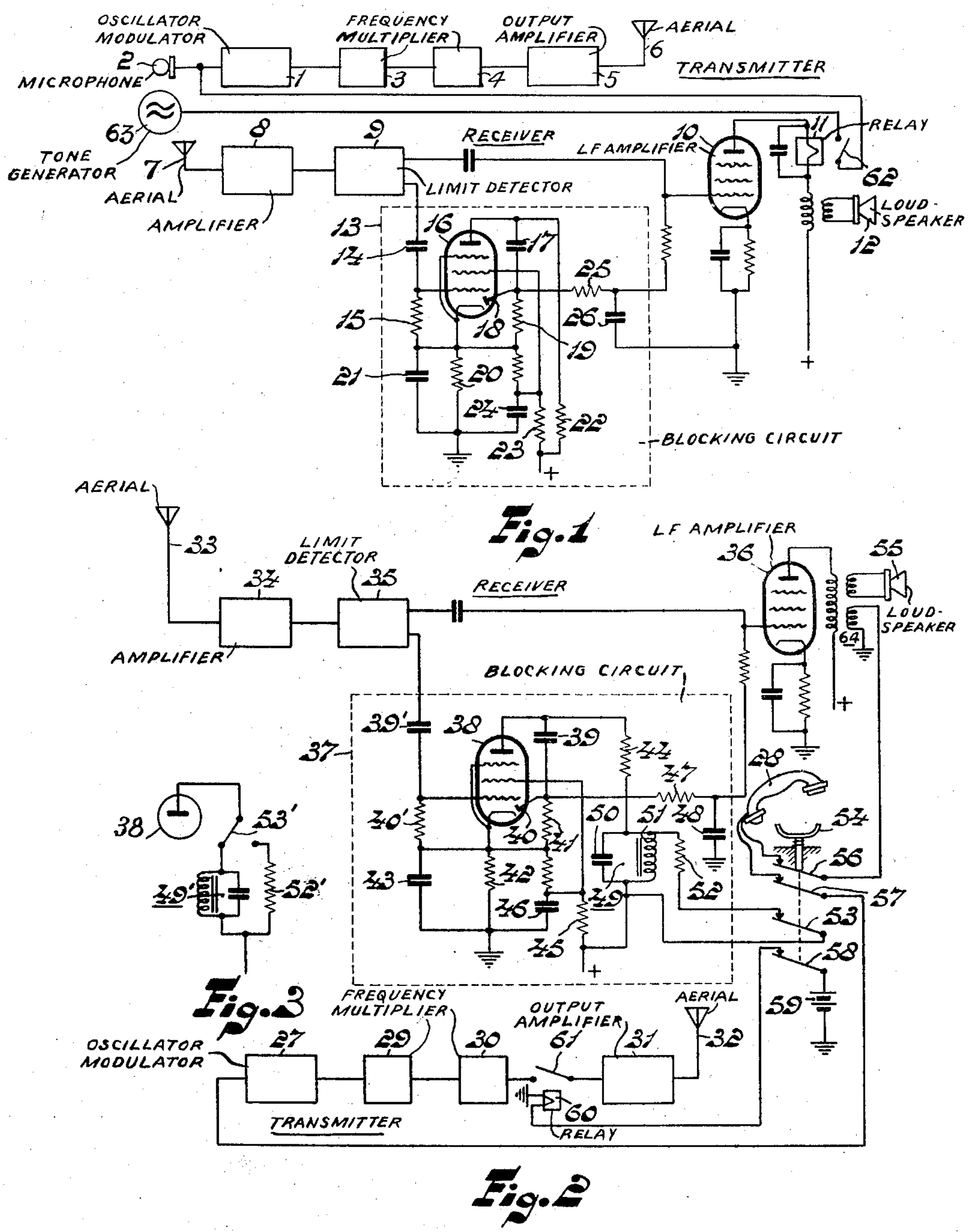
Fig. 1 is a schematic diagram of a preferred embodiment of a main station of the system of the present invention.
Fig. 2 is a schematic diagram of a preferred embodiment of a substation of the system of the present invention, adapted to cooperate with the main station of Fig. 1.
Fig. 3 is a schematic diagram of a modification of part of the substation of Fig. 2.

The main station of Fig. 1 comprises a transmitter-receiver which is designed for duplex traffic. The transmitter, which may be designed either for frequency modulation or amplitude modulation, may comprise an oscillator-modulator stage 1, to the input of which a microphone 2 is connected. The oscillations produced, which in this case are modulated in frequency, are supplied by way of a frequency multiplier 3 to a further frequency multiplier 4. The total frequency multiplication is, for example, 64-fold in order to obtain a carrier-wave frequency of about 160 megacycles per second. The high-frequency oscillations thus obtained are amplified in an output amplifier 5 and emitted by an aerial 6 which is connected thereto. The transmitter described is of a known type, so that a detailed description thereof would be superfluous.

The main station furthermore comprises a receiver having an aerial 7 which, if desired, may be combined with the aerial 6 to form a common transmitting-receiving aerial. The aerial 7 is connected to a receiving device 8, in which the incoming signal is amplified in the usual manner and transposed in frequency to obtain intermediate-frequency oscillations which, after being limited, are detected by a detector 9. The detected signal is supplied to the control grid of a low-frequency amplifying tube 10, the output circuit of which includes a relay 11 in series with a loudspeaker 12.

The receiver of the main station also comprises a blocking circuit 13 which is fed by detected oscillations located outside the speech-frequency band. If no signal is received, strong noise voltages occur in the output circuit of detector 9. In order to suppress the noise voltages, the output circuit of detector 9 is connected by way of a filter comprising a condenser 14 and a leakage resistance 15 to the control rgid of an amplifying tube 16, which is connected as a pentode and which serves, in the absence of a carrier-wave, to supply to the control grid of the low-frequency amplifying tube 10 a negative voltage such that tube 10 is made inoperative.

The filter 14, 15 has a limiting frequency such that only higher frequencies (for example, above 5 to 10 kilocycles per second) of the detected noise spectrum are supplied to the tube 16. The amplified noise is supplied by way of a capacitor 17 to a diode-anode 18, which has a cathode in common with the pentode part of the noise-amplifying tube 16. A direct voltage, the amplitude of which is dependent upon the intensity of the noise, is set up across a resistor 19 provided between cathode and diode-anode. The cathode is grounded by way of a cathode resistor 20 and a capacitor 21 connected in parallel thereto. The anode of the noise-amplifying tube is fed by way of a resistor 22 from the positive terminal of a voltage source, and the screen grid is connected by way of a resistor 23 to said terminal and by way of a decoupling condenser 24 to ground. The direct voltage set up at the diode-anode 18 is thus the difference between the voltages which are set up at the cathode resistor 20 and the resistor 19 and which voltages have opposite polarities. The proportioning is such that, in the absence of a carrier wave, the voltage across the resistor 19 is somewhat higher in a negative direction than that across the cathode-resistor. The difference voltage is supplied to the control grid of the low-frequency amplifying tube 10 by way of a filter constituted by a resistor 25 and a grounded capacitor 26 in order to cut off this tube.

When a signal is received, due to which the noise decreases, the voltage across the cathode resistor 20 exceeds the voltage across the resistor 19, which in the meantime has decreased. This results in a decrease of the biasing potential of the control grid of the low-frequency amplifying tube 10, which initially had a negative bias such that the tube was cut off, so that the tube is now released and the relay 11 included in the output circuit thereof is energized. The function of this relay will be mentioned hereinafter.

Fig. 2 is a schematic diagram of a substation adapted for wireless communication with the main station of Fig. 1. The substation comprises a transmitter and a receiver for duplex traffic on a pair of frequencies associated with the main station.

The transmitter is substantially identical to the transmitter of the main station and comprises an oscillator-modulator stage 27 with the microphone of a telemicrophone 28 connected thereto, frequency-multiplying stages 29, 30 and an output amplifying stage 31, to which a transmitting aerial 32 is connected.

The receiver of the substation is also substantially identical to the receiver of the main station and is described in connection with Fig. 1. Its receiving channel comprises an aerial 33, an amplifier comprising a high-frequency and intermediate-frequency portion 34, a limiter comprising a detector 35 and a low-frequency amplifier 36. Also connected to the output circuit of the detector 35 is a blocking circuit 37 comprising an amplifying tube 38 which is coupled to the output of said detector by way of a high-pass filter 39', 40', of which the lowest limiting frequency is, for example, from 5 to 10 kilocycles per second. The blocking circuit 37 also comprises elements 39 to 48, which are identical to the elements 17 to 26, respectively, of Fig. 1. The function of the blocking circuit 13 is described in connection with Fig. 1, so that a further description thereof would be superfluous.

The blocking circuit 37 further comprises a tone filter 49 included in the anode circuit of the amplifying tube 38 and which comprises a capacitor 50 and a coil 51 in parallel connection with the capacitor 50; said tone filter being tuned to a frequency outside the speech-frequency band, for example, a frequency of 12 kilocycles per second. The tone filter 49 is bridged by a resistor 52 in series with a switch 53, which switch is actuated by a hook contact 54 connected thereto when the telemicrophone 28 is taken off or replaced on its cradle or hook.

Wireless transmission of intelligence between main station of Fig. 1 and a substation of Fig. 2 may occur in the following manner:

In the rest condition, which is sometimes also referred to as the "listening-out condition," the receiver of the main station only is switched-in, in order to receive any intelligence transmitted by one of the substations. However, the low-frequency part of said receiver, as well as those of the substations, is made inoperative, in the absence of a signal, by the blocking circuits (such as 13 and 37, respectively), which are fed by the noise voltages outside the speech-frequency band then occurring in each receiver. If the main station wishes to exchange intelligence with one of the substations, the transmitter of the main station is switched on, the microphone 2 is spoken into and a calling signal is transmitted which is characteristic of a substation or, as the case may be, a group of substations to be called. If the calling signal transmitted by the main station exhibits at least a predetermined minimum amplitude upon reception by the substations, the blocking circuit 37 becomes ineffective and the low-frequency part of the substation receiver is no longer cut off. The calling signal is made audible in a loudspeaker 55 of the substation and an operator at the called substation answers the call by taking the telemicrophone 28 off the hook 54. When the telemicrophone 28 is taken off its hook 54, a multiple switch actuated by said hook occupies the position shown in Fig. 2. The telemicrophone 28 is connected by way of a switch 56 to the output circuit 64, the output of stage 36 of the receiver, and to the input of the transmitter modulator 27 by a swich 57. Furthermore, a voltage supplied by a voltage source 59 is fed to a relay 60 by way of a switch 58 actuated by the hook 54. When the relay 60 is energized, switch 61 operates the transmitter of the substation, which is normally switched off in the rest condition to save energy, and a carrier wave is transmitted via the aerial 32.

The blocking circuit 13 of the main station of the receiver is de-activated when the modulated or non-modulated carrier wave is received by the main station. The output amplifying tube 10 becomes adjusted for normal speech frequency amplification and the anode current of tube 10 increases, so that the relay 11 is energized and a make-contact 62 thereof is closed.

The connection between the main station and the desired substantion is now established and the intelligence to be transmitted may be transmitted by the main station. According to the invention, in order to cut off reception at the substations other than the substation concerned, after the station being called as answered the call, as a result of which the switch 62 closes, a tone generator 63 at the main station, which may supply an oscillation having a frequency of, for example, 12 kilocycles per second, is connected to the modulator 1 of the transmitter for the duration of the call being exchanged. This tone, which is transmitted as an additional modulation on the speech carrier-oscillation of the main station transmitter, is received and detected by all substation receivers. The detected tone is passed by the high-pass filter 39', 40' of the substation blocking circuit 37 and amplified in the amplifying tube 38. The voltage then set up across the tone filter 49, which is tuned to this tone, causes the output amplifying tube of each substation in which the telemicrophone 28 was not taken off its cradle 54 to be cut off in a similar manner as has been described in connection with the reception of noise voltages located above the speech-frequency band. In the substation being called, in which the telemicrophone 28 is taken off its cradle 54 for answering the call, the tone filter 49 is bridged by the resistor 52 by way of the switch 53. After the call is over, the telemicrophone 28 is replaced on its cradle 54 and the tone filter 49 is no longer bridged by the resistor 52. The transmitter of the substation is switched off wholly or in part by the de-energization of relay 60 and the blocking circuit 13 of the main station cuts off the low-frequency part of the receiver of the main station, so that the tone generator 63 is switched off. Since the transmitter of the main station is switched off at the same time, the negative bias supplied by the blocking circuit 37 of the substation is relatively low and the substation receiver is ready for the reception of a subsequent call. The low-frequency part of each substation receiver, which was cut off by the tone transmitted from the main station for the duration of the message with the substation being called, is then conditioned to become operative again.

Consequently, a system for wireless transmission of intelligence between a main station and a plurality of substations is thus effected in an inexpensive manner with the use of simple means which, normally, are substantially available in the receiver. Said system is preferable to the conventional communication systems of this type in those cases in which no secrecy of the intelligence transmission is required.

In the embodiment of Fig. 2, the tone filter 49 is damped by means of the resistor 52 connected in series with the switch 53. It is alternatively possible to give the switch 53 the form of a change-over switch such as indicated by a switch 53' in Fig. 3, so that either a resistor 52' or the tone filter 49' is included in the anode circuit of the tube 38 by the switch 53' in accordance with whether or not a call is being made.

The case in which both the main station and the substations comprise a transmitter-receiver designed for duplex traffic, has been considered. However, the invention is also applicable where the main station and the substations comprise transmitter-receivers designed for simplex traffic. In the latter case, automatic operation is possible, since in the switchover from receiving to transmitting, the tone generator of the transmitter of the main station is changed-over in accordance with the operating condition of the blocking circuit 13 before the change-over operation.

While I have thus described my invention with specific examples and embodiments thereof, other modifications will be readily apparent to those skilled in the art without departing from the spirit and the scope of the invention as defined in the appended claims.

What is claimed is:

1. A wireless transmission system of a type including a main station and a plurality of substations, comprising means for transmitting speech frequency signals on carrier oscillations from said main station to said substations, means for receiving said carrier oscillations having said speech frequency signals at each of said plurality of substations, means for transmitting speech frequency signals on carrier oscillations from each of said plurality of substations to said main station, means at said main station for receiving the carrier oscillations having said speech frequency signals transmitted from said substations, circuit means provided in each of said receiving means and responsive to detected oscillations having frequencies outside the speech frequency band for preventing noise voltages from appearing at the output of said receiving means during the absence of incoming carrier oscillations, said circuit means being rendered inoperative in response to a received signal having a frequency within the speech frequency band, means for continuously transmitting a tone signal having a frequency above the speech frequency band from said main station to said plurality of substations in response to the speech frequency signals received by said main station from any of said substations, said tone transmitting means being continuously operative during the reception of speech frequency signals by said main station, further circuit means provided in each of said substation receiving means for blocking the passage of received speech frequency signals from the output of said receiving means in response to said tone signal from said main station, and switching means coupled to said further circuit means for rendering said further circuit means inoperative intermittently.

2. A wireless transmission system as claimed in claim 1, further comprising means for rendering said tone transmitting means inoperative during the non-reception of speech frequency signals by said main station.

3. A wireless transmission system as claimed in claim 2, further comprising means for transmitting said tone signal as an additional modulation on said carrier oscillations transmitted by said first-mentioned means.

4. A wireless transmission system as claimed in claim 3, wherein said further circuit means comprises a tone filter tuned to a frequency outside the speech frequency band and said switching means comprises a series connection of a switch and a resistor, said series connection being connected across said filter.

5. A wireless transmission system as claimed in claim 4, further comprising means for automatically closing said switch when the transmitting means associated with said further circuit means is energized.

6. A wireless transmission system of a type including a main station and a plurality of substations, comprising means for transmitting speech frequency signals on carrier oscillations from said main station to said substations, means for receiving said carrier oscillations having said speech frequency signals at each of said plurality of substations, means for transmitting speech frequency signals on carrier oscillations from each of said plurality of substations to said main station, means at said main station for receiving the carrier oscillations having said speech frequency signals transmitted from said substations, circuit means provided in each of said receiving means and responsive to detected oscillations having frequencies outside the speech frequency band for preventing noise voltages from appearing at the output of said receiving means during the absence of incoming carrier oscillations, said circuit means being rendered inoperative in response to a received signal having a frequency within the speech frequency band, means for continuously transmitting a tone signal having a frequency above the speech frequency band from said main station to said plurality of substations in response to speech frequency signals received by said main station from any of said substations, said tone transmitting means being continuously operative during the reception of speech frequency signals by said main station and inoperative during the non-reception of speech frequency signals by said main station, said tone signal being transmitted as an additional modulation on said carrier oscillations transmitted by said first-mentioned means, further circuit means provided in each of said substation receiving means for blocking the passage of received speech frequency signals from the output of said receiving means in response to said tone signal from said main station, and switching means coupled to said further circuit means for rendering said further circuit means inoperative intermittently, said switching means in one condition preventing said further circuit means from blocking the passage of received speech frequency signals from the output of said receiving means and causing energization of the transmitting means associated with said further circuit means, said switching means in another condition permitting said further circuit means to block the passage of received speech frequency signals from the output of said receiving means and causing deenergization of said associated transmitting means.

7. A wireless transmission system as claimed in claim 6, wherein said tone transmitting means comprises a tone generator and a relay having contact points connected between said tone generator and said main station transmitting means and a coil connected to the output of said main station receiving means.

8. A wireless transmission system as claimed in claim 7, wherein said further circuit means comprises a tone filter tuned to a frequency outside the speech frequency band and said switching means comprises a series connection of a switch and a resistor, said series connection being connected across said filter.

References Cited in the file of this patent

UNITED STATES PATENTS

| | | |
|---|---|---|
| 2,061,699 | Fox | Nov. 24, 1936 |
| 2,326,290 | Dickieson | Aug. 10, 1943 |
| 2,459,675 | Noble | Jan. 18, 1949 |
| 2,479,305 | Brown | Aug. 16, 1949 |
| 2,495,452 | Grove | Jan. 24, 1950 |
| 2,546,987 | Eannarino | Apr. 3, 1951 |
| 2,734,131 | Magnuski | Feb. 7, 1956 |